Feb. 18, 1947.  O. C. HELGESON  2,415,882
TUBE END FLARING TOOL
Filed Sept. 1, 1944
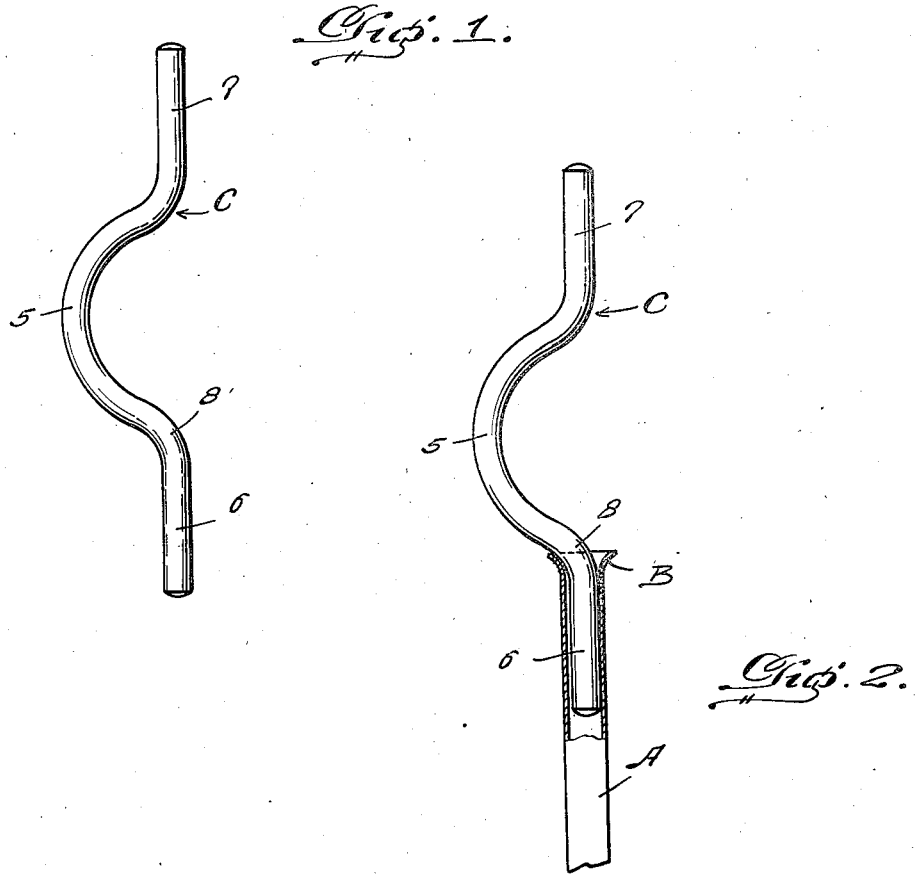
Inventor
Oscar C. Helgeson,
By McMorrow & Berman
Attorneys Patented Feb. 18, 1947

2,415,882

UNITED STATES PATENT OFFICE 2,415,882

TUBE END FLARING TOOL

Oscar C. Helgeson, Dawson, Minn.

Application September 1, 1944, Serial No. 552,343

1 Claim. (Cl. 81—15)

This invention relates to new and useful improvements in tools or devices for flaring the ends of tubes.

The principal object of the present invention is to provide a tool of simple construction and which may be readily disposed in position to act on the work quickly and to produce uniform results.

Another important object of the invention is to provide a tube flaring device constructed in one piece and which if constructed of good steel will undoubtedly last for an indefinite period.

Various other important objects and advantages of the invention shall become apparent to the reader of the following description.

In the drawing:

Figure 1 represents a side elevational view of the flaring tool.

Figure 2 is a fragmentary side elevational view of the flaring tool with a portion of a tube being flared, shown in section.

Referring to the drawing, wherein like numerals designate like parts it can be seen that reference character A denotes a copper tube, the end portion of which has been flared, as at B by the tool which makes up the present invention and which is generally referred to by reference character C.

The tool specifically consists of an elongated member constructed of a high grade tool steel. This member is preferably round in cross section and has a flare-forming semi-circular curved portion 5. The end portions of this element are aligned, one end forming a guide pin 6 while the other end forms a brace chuck entering pin 7.

As is apparent in Figure 1, the elbow 8 must have a definite outside curve, because it is this outside curve at the elbow 8 which defines and forms the flare B.

The specific shape of the other elbow is immaterial unless it is desired that this elbow be used for forming a different shaped flare, in which instance the tool would be reversible.

Of course, this tool could be used in an electric drill for fast operation.

In the operation of the device, the tool is inserted, as shown in Figure 1, and the pin 7 inserted into the chuck of a hand brace or electric drill. Force is exerted along the longitudinal axis of the tool to maintain the outer curve of the elbow 8 against the edge of the tube. As the tool is rotated and the force gradually increased, the end of the tube will be gradually lipped outwardly to form the flare B.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A tube end flaring tool for use in flaring the ends of tubes, said tool being in one piece and comprising a semi-circular curved portion intermediate the length of the tool, a brace chuck entering pin end, an elbow portion joining said curved portion and said chuck entering pin end, a guiding pin end of a diameter slightly less than the internal diameter of the tube to be flared, and a flare forming elbow connecting said curved portion and said guiding pin end, whereby, with the guiding pin end inserted in the tube, upon rotation of the flare forming elbow about the axis of the guiding pin, the action of said elbow against the inner side of the tube end will flare such end outwardly.

OSCAR C. HELGESON.

REFERENCES CITED

The following references are of record in the file of this patent:

UNITED STATES PATENTS

| Number | Name | Date |
|---|---|---|
| 1,647,447 | Hartnett | Nov. 1, 1927 |
| 1,162,681 | Bush | Nov. 30, 1915 |
| 1,476,756 | Junkers | Dec. 11, 1923 |

FOREIGN PATENTS

| Number | Country | Date |
|---|---|---|
| 541,263 | Gladel, et al. (France) | July 25, 1922 |